(12) United States Patent
Rielly et al.

(10) Patent No.: US 7,503,360 B2
(45) Date of Patent: Mar. 17, 2009

(54) RADIAL FARM TIRE FOR HIGH CLEARANCE SPRAYERS

(75) Inventors: Kevin Michael Rielly, Monroe, WI (US); Thomas Edward McGaffick, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 626 days.

(21) Appl. No.: 11/304,918

(22) Filed: Dec. 15, 2005

(65) Prior Publication Data

US 2007/0137758 A1  Jun. 21, 2007

(51) Int. Cl.
| B60C 9/08 | (2006.01) |
| B60C 9/17 | (2006.01) |
| B60C 9/30 | (2006.01) |
| B60C 11/11 | (2006.01) |
| B60C 15/00 | (2006.01) |

(52) U.S. Cl. .................. 152/209.12; 152/454; 152/455; 152/538; 152/554

(58) Field of Classification Search ............ 152/209.12, 152/454, 455, 538, 554
See application file for complete search history.

(56) References Cited

U.S. PATENT DOCUMENTS

| 3,814,161 A | * | 6/1974 | Powell et al. ............... 152/454 |
| 4,209,050 A | * | 6/1980 | Yoshida et al. .............. 152/454 |
| 5,042,546 A | * | 8/1991 | Forney et al. ............... 152/454 |
| 6,047,901 A | | 4/2000 | Pederson et al. |
| 6,705,546 B2 | | 3/2004 | Bosch |
| 2004/0118497 A1 | | 6/2004 | Bonko et al. |

* cited by examiner

*Primary Examiner*—Adrienne C Johnstone
(74) *Attorney, Agent, or Firm*—David L. King

(57) ABSTRACT

A high aspect ratio agricultural pneumatic tire has a carcass including a pair of bead portions each having a bead core and two pair of first and second carcass plies of synthetic cords oriented radially and wrapped from the inside of each bead core around to an axially outer turnup end. The first pair of plies is radially inward and adjacent the second pair of plies between the bead cores and having the turnup ends $T_1$, $T_1'$ wrapped about the bead cores and the turnup ends $T_2$, $T_2'$ of the second pair of plies. The turnup end of the first pair of plies extends outwardly and radially along the bead filler wherein $T_1$, $T_1'$ are located between 60% and 80% of the radial location Y of maximum section width (SW) of the tire and $T_2$, $T_2'$ are located between 30% and 50% of Y.

10 Claims, 2 Drawing Sheets

RADIAL FARM TIRE FOR HIGH CLEARANCE SPRAYERS

FIELD OF THE INVENTION

The present invention generally relates to tires and, more specifically, to pneumatic tires for row-crop field sprayers and like agricultural machinery.

BACKGROUND OF THE INVENTION

Self-propelled row-crop field sprayers are specialized agricultural machinery for applying liquids, such as fertilizers or insecticides, to crops planted and grown in multiple parallel rows. Adjacent pairs of rows are tightly spaced for maximizing the plant density of the row crop being grown. As a result, row-crop field sprayer tires have a narrow section width and a high aspect ratio so that the tire can travel within the intra-row space. Because row-crop field sprayers are extremely massive agricultural-machines, their pneumatic tires must have the ability to carry large loads. Pneumatic tires for the row-crop field sprayer also have to have a large rim diameter so that the field sprayer can clear the plants in the crop rows. Moreover, the pneumatic tires must exhibit good traction in either wet or dry conditions. In addition, row-crop field sprayer tires must be designed to withstand hard surface roading as the row-crop field sprayer is moved on paved roads between fields at a transport speed significantly faster than the service speed in the field.

As the spacing between adjacent rows has narrowed for increasing the crop density, a need has arisen for narrowed pneumatic tires for row-crop field sprayer service. Because the tire load increases as the footprint narrows, conventional agricultural pneumatic tires cannot satisfy the full range of performance and design parameters required for row-crop field sprayer service. In particular, the lugs of such conventional agricultural pneumatic tires experience adverse consequences, such as cracking, tearing or, at the least, irregular wear patterns, resulting from hard surface roading.

The inferior performance of conventional agricultural pneumatic tires arises from the faceted leading edge of the lugs, which define outside corners that provide stress concentration points under the conditions of high loading and fast speed. The leading edge experiences a significantly larger strain than the lug's trailing edge so that the outside corners on the leading edge experience significant strains. In particular, tires having conventional lug widths are prone to deflection which creates cracking, tearing and irregular wear patterns. An improved tread with unique lug profiles has been described in related and co-pending application publication US 2004/0118497 which is incorporated herein by reference in its entirety.

In addition to the problems associated with the tread a second issue is the focus of this invention which is directed to the structural strength of the carcass. Under severe and somewhat extreme tire durability testing the tire as described in US 2004/0118497 exhibited carcass turnup separations at maximum loads at inflation in as few as 400 hours of service. These turnup separations eventually can cause the sidewalls to crack and cause a loss of inflation. Therefore, conventional agricultural pneumatic tires for service with row-crop field sprayers are particularly susceptible to the aforementioned adverse consequences, which significantly reduce tire durability.

For these and other reasons, it would be desirable to provide a pneumatic agricultural tire for row-crop field sprayer services that can provide superior load carrying capacity wet and dry traction, that can carry heavy loads on a narrow-width ground-contacting footprint, and that does not experience any significant adverse consequences due from hard surface roading.

SUMMARY OF THE INVENTION

The invention is directed to a high aspect ratio agricultural pneumatic tire having a tread, a belt reinforcing structure and a carcass. The tread includes a circumferential inner tread and a plurality of lugs each projecting radially outward from the inner tread. The belt reinforcing structure includes four or more belt layers reinforced by synthetic cords and underlying the tread. The carcass has a pair of bead portions each having a core and a bead filler above each bead core and two pair of first and second carcass plies. Each ply is reinforced by synthetic cords oriented radially and wrapped from the inside of each bead core around to an axially outer turnup end. The first pair of plies is radially inward and adjacent the second pair of plies between the bead cores and having the turnup ends wrapped about the bead cores and the turnup end of the second pair of plies. The turnup end of the first pair of plies extends outwardly and radially along said bead filler to a terminal end $T_1$, $T_1'$ and said turnup ends of said second pair of plies extends to turnup ends $T_2$, $T_2'$ wherein $T_1$, $T_1'$ are located between 60% and 80% of a location Y defined as the radial location of maximum section width (SW) of the tire and the second pair of plies have the terminal ends $T_2$, $T_2'$ extend above the bead cores to a location 30% to 50% of Y. The aspect ratio is preferably greater than 85%, more preferably about 90% or greater. The ply cords are nylon and the belt cords are preferably aromatic polyamide or aramid or optionally can be polyester to form a substantially synthetic textile carcass.

DEFINITIONS

"Aspect Ratio" means the ratio of its section height to its section width.

"Axial" and "axially" means the lines or directions that are parallel to the axis of rotation of the tire.

"Axially Inward" means in an axial direction toward the equatorial plane.

"Axially Outward" means in an axial direction away from the equatorial plane.

"Bead" means the circumferentially substantially inextensible metal wire assembly that forms the core of the bead area, and is associated with holding the tire to the rim.

"Carcass" means the tire structure apart from the belt structure, tread, undertread, and sidewall rubber over the plies, but including the beads.

"Casing" means the carcass, belt structure, beads, sidewalls, and other components of the tire excepting the tread and the undertread.

"Circumferential" means lines or directions extending along the perimeter of the surface of the annular tread perpendicular to the axial direction.

"Equatorial Plane" (EP) means the plane perpendicular to the tire's axis of rotation and passing through the center of its tread.

"Footprint" means the contact patch or area of contact of the tire tread with a flat surface at zero speed and under normal load and pressure.

"Inner" means toward the inside of the tire.

"Lateral Edge" means the axially outermost edge of the tread as defined by a plane parallel to the equatorial plane and intersecting the outer ends of the axially outermost traction lugs at the radial height of the inner tread surface.

"Leading" refers to a portion or part of the tread that contacts the ground first, with respect to a series of such parts or portions, during rotation of the tire in the direction of travel.

"Lugs" refer to discontinuous radial rows of tread rubber in direct contact with the road surface.

"Net-to-Gross Ratio" means the ratio of the normally loaded and normally inflated tire tread rubber that makes contact with a hard flat surface, divided by the area of the tread, including non-contacting portions such as grooves as measured around the entire circumference of the tire.

"Outer" means toward the tire's exterior.

"Pitch" means a section of the tread in the circumferential direction that is repeated around the outer circumference of the tire. Normally, a pitch contains a load-bearing element or lug that contact the road surface and an adjacent channel which separates adjacent lugs.

"Pneumatic Tire" means a laminated mechanical device of generally toroidal shape, usually an open-torus, having beads and a tread and made of rubber, chemicals, fabric and steel or other materials. When mounted on the wheel of a motor vehicle, the tire through its tread provides traction and contains the fluid that sustains the vehicle load.

"Radial" and "Radially" mean directions radially toward or away from the axis of rotation of the tire.

"Section Height" (SH) means the radial distance from the nominal rim diameter to the outer diameter of the tire at its equatorial plane.

"Section Width" (SW) means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Shoulder" means the upper portion of sidewall just below the tread edge.

"Sidewall" means that portion of a tire between the tread and the bead area.

"Trailing" refers to a portion or part of the tread that contacts the ground last, with respect to a series of such parts or portions, during rotation of the tire in the direction of travel.

"Tread" means a molded rubber component which, when bonded to a tire casing, includes that portion of the tire that comes into contact with the road when the tire is normally inflated and under normal load.

"Tread Width or Tread Arc Width" means the arc length of the tread surface in the axial direction, that is, in a plane parallel to the axis of rotation of the tire.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION OF THE INVENTION

Although the invention will be described next in connection with certain embodiments, the invention is not limited to practice in any one specific type of row-crop field sprayer. It is contemplated that the pneumatic tires of the invention can be used with a variety of agricultural machinery having a high center of gravity and a large mass, including but not limited to row-crop field sprayers. Exemplary row-crop field sprayers with which the pneumatic tires of the invention can be used are commercially available, for example, from the Model 4710 and Model 6700 Self-Propelled Sprayers manufactured by John Deere (Moline, Ill.) and the New Holland Model SF550 self-propelled sprayer manufactured by CNH Global N.V. (Lake Forest, Ill.), and such commercially available row-crop field sprayers can be equipped with pneumatic tires constructed in accordance with the present invention. The description of the invention is intended to cover all alternatives, modifications, and equivalent arrangements as may be included within the spirit and scope of the invention as defined by the appended claims.

Figure 1:
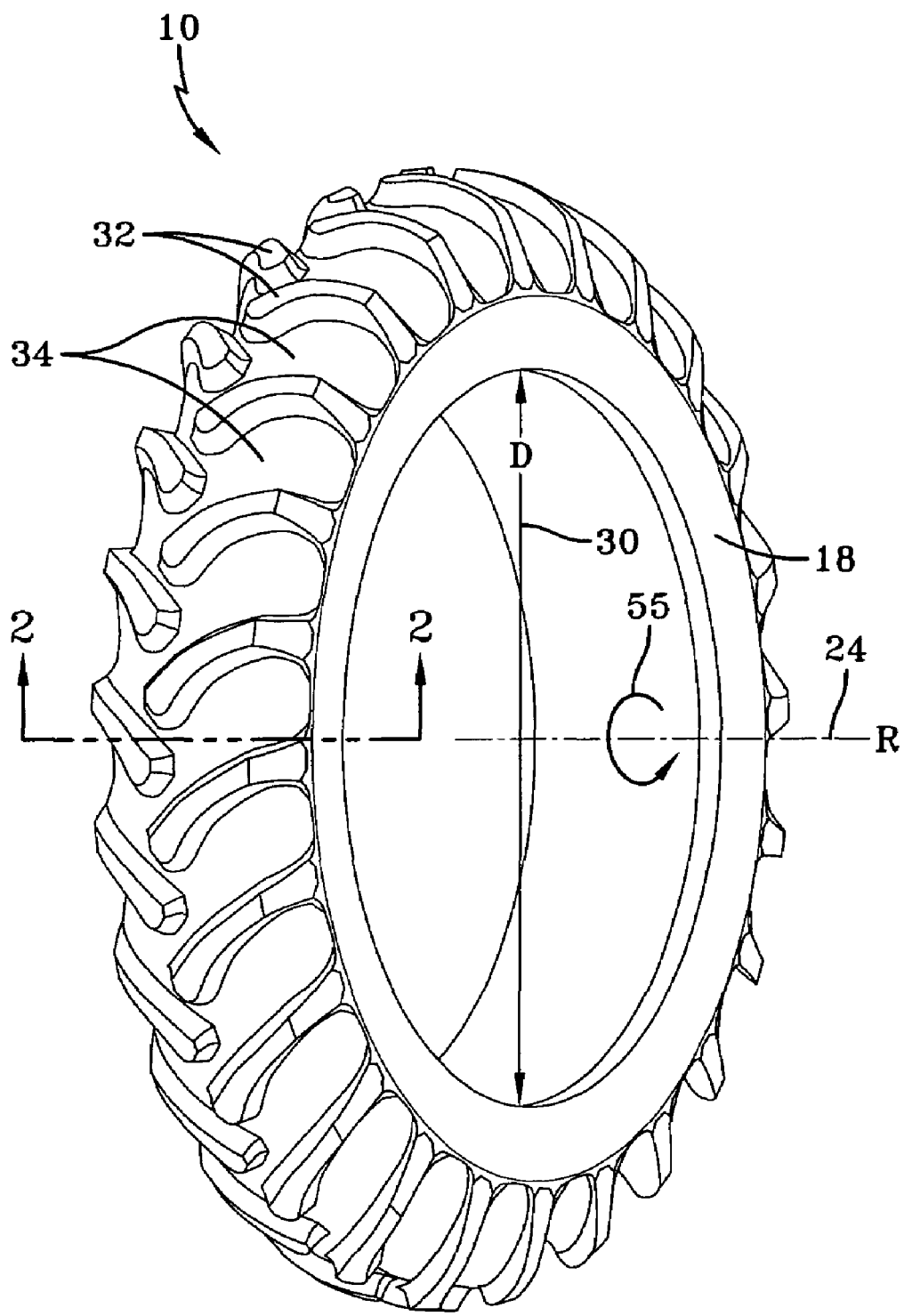
FIG. 1 is a perspective view of a pneumatic tire according to the principles of the invention.

With reference to FIG. 1, a pneumatic agricultural tire 10 constructed according to the principles of the invention includes a casing 12 and a tread 14. Tire 10 has an axis of rotation (R) 24, an equatorial plane (EP) 26, a maximum section width (SW) 28, and a rim diameter (D) 30. Casing 12 includes a pair of sidewalls 16, 18, a cord-reinforced rubber-coated carcass 20 and a pair of bead portions 17, 19 each portion including annular bead cores 21, 22 and an apex 27, 29. Carcass 20 includes four or more carcass plies 23 extending circumferentially about the axis of rotation 24 of the tire anchored at opposite ends to a corresponding one of beads 21, 22 and four or more belt plies 25 disposed radially outward from the carcass plies 23.

Tread 14 includes a pattern of ground-engaging lugs 32 disposed radially outward of the carcass 20, in which each of the lugs 32 projects radially outwardly from an inner tread 34, which extends circumferentially about the tire 10. The lugs 32 have a depth measured relative to the inner tread 34, which may be the depth classified as an R1 depth by the Tire and Rim Association, Inc. (Copley, Ohio). Discharge channels 40 between adjacent pairs of the lugs 32 extend axially toward a corresponding one of two opposite shoulders or lateral edges 42, 44 of tread 14 for clearing accumulated mud and the like from the volumetric space between the lugs 32.

Figure 2:
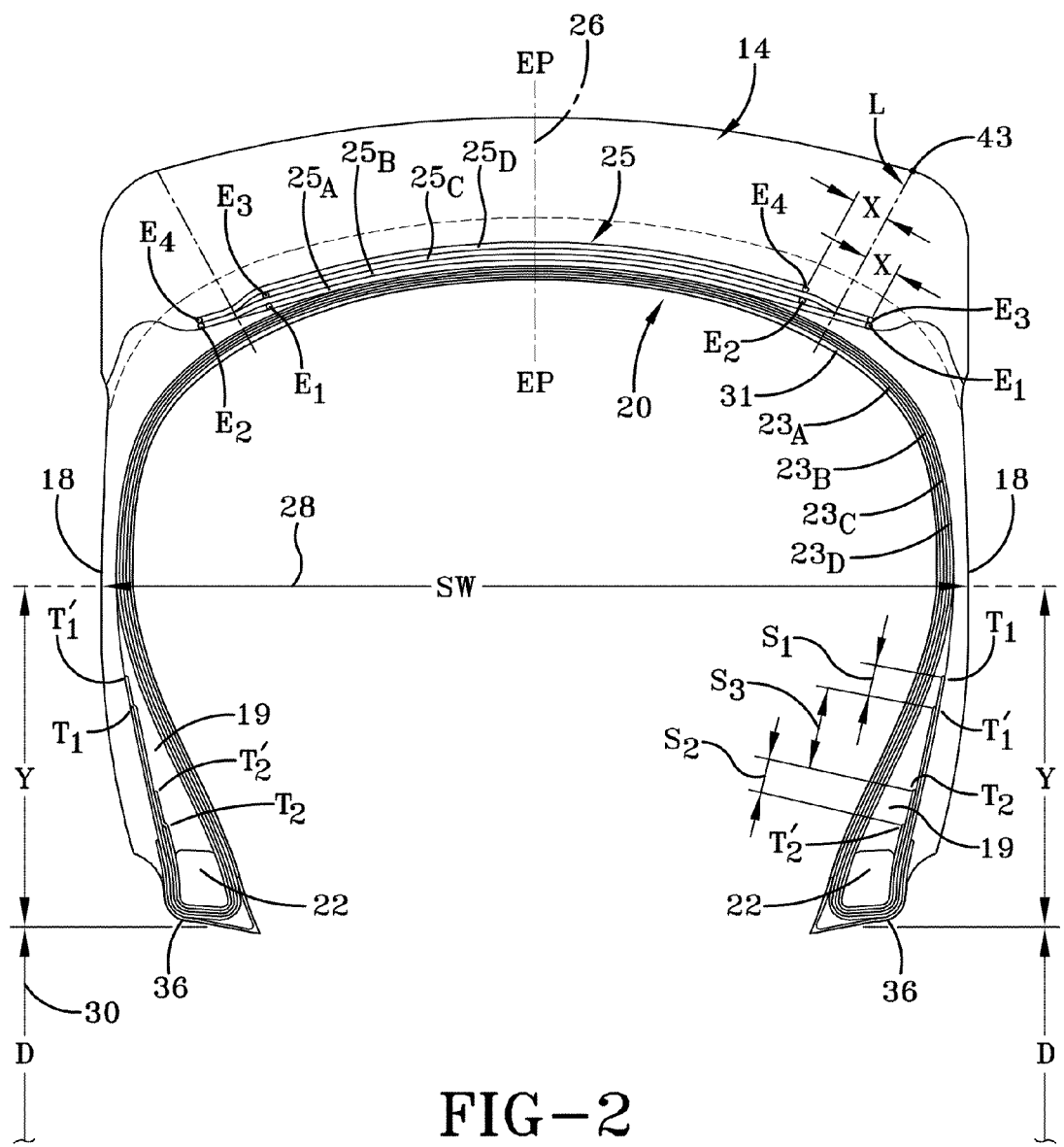
FIG. 2 is a cross-sectional view of the pneumatic tire of FIG. 1.

With reference to FIG. 2, a cross section of the tire according to the present invention is illustrated. Underlying the tread 14 is the casing 12 including a belt reinforcing structure 25 overlying a carcass 20. For a better understanding for the tire construction it is important to understand that the reinforcing belt structure 25 is made of 4 layers of synthetic textile cords reinforced plies, preferably aromatic polyamide or aramid cord reinforced plies. Each of the plies 25A, 25B, 25C, 25D as shown in FIG. 2 is of the same axial or transverse width $W_B$, the belt width $W_B$ being the same for all ply layers means that one common roll of belt stock can be delivered to the tire building machine when building the tire belt reinforcing structure 25. Each belt is applied in such a fashion that the adjacent belt layers have substantially equal but oppositely oriented cord angles. As the first belt layer is applied it is shifted off center plane or equatorial plane by a distance of approximately X. As shown the first belt layer 25A is shifted by a distance X towards the right of the tire 10 to an end location $E_1$. The second belt layer 25B is shifted to the left of the equatorial plane by a distance X to an end location $E_2'$ as shown. The third belt layer 25C is shifted to the right by the amount X to an end location $E_3$ and the fourth belt layer is shifted relative to the equatorial plane by a distance X to an end location $E_4'$. This method of manufacture permits the belts 25 to be staggered in such a fashion that the overall radially adjacent layers have belt ends that do not align, but are in fact positioned by a distance of at least X from a line L, L being a perpendicular line as being measured from the carcass plies 23 to intersect the tread at the location 43. The resultant structure means that a rather strong belt reinforcing structure 25 can be made with the advantage of only requiring one width $W_B$ for each of the layers.

With reference to the underlying carcass of the tire 10 the tire has a pair of bead cores 21, 22 and wrapped around these bead cores is a radial carcass ply structure 23 having four ply layers 23A, 23B, 23C, 23D. The first ply layer 23A is adjacent to an air impervious liner 31 which is located radially inward between both bead structures. This air impervious liner 31 is preferably made of halobutyl rubber that helps maintain the inflation air inside the cavity of the tire 10 during normal use. The plies 23A and 23B operate as a first pair of plies, each ply 23A and 23B has a cut width $W_1$ that is equal. As in the belt structure 25 by shifting the ply 23A or 23B on the tire building drum when assembled by a distance ½ $S_1$ to the right or the left of the equatorial plane EP, the ply when turned up will have a turnup end that terminates at locations $T_1$ or $T_1'$ depending on the direction that the ply is shifted. This shifting of the plies of equal width $W_1$ provides a staggering at the ply endings $T_1$, $T_1'$ by a total distance $S_1$. This is important because it helps insure the carcass structure does not have localized stress as would be the case if the ply endings in pairs of the same width were matched at the same location. This reduction in stress is extremely important as it relates to tire durability. This first pair of plies has high ply turnup ends $T_1$, $T_1'$.

With reference to ply structures 23C and 23D as shown in FIG. 2 these are radially outward of the plies 23A and 23B between the bead cores 21, 22 and these plies operate as a second pair of plies having lower ply endings that are located at $T_2$ and $T_2'$ as shown. These ply endings are each shifted by an amount ½ $S_2$ relative to the equatorial plane, one shifted to the left and one shifted to the right. As illustrated $S_2$ is the total stagger distance between $T_2$ and $T_2'$ and is approximately equal to the distance $S_1$. On the right side of FIG. 2 the space between the lower of the first ply 23B ending $T_1'$ and the distance between the higher of the second of ply 23C ending $T_2$ is a distance of $S_3$, $S_3$ has been selected to be approximately equal to two times $S_2$ or $S_1$ or approximately the sum of $S_1$ and $S_2$ as shown. As further illustrated all the ply endings are adjacent the bead filler 19 on the right side of FIG. 2, the bead filler 19 extends to a distance approximating the radial distance between the nominal bead diameter and the maximum section width, this distance being identified as Y, the bead filler extending between 100 and 90% of Y. The high ply ending first set of plies 23A, 23B have ends at $T_1$ and $T_1'$ located between 60 and 80% of the location Y. Whereas the second pair of plies 23C, 23D has the terminal ends $T_2$ and $T_2'$ extend above the bead cores 29, 22 to a location 30 to 50% of Y.

An evaluation of the tire 10 according to the present invention employing a pair of high ply turnups and a pair of low ply turnups as shown in the illustrated embodiment of FIG. 2 was done. Under maximum load conditions under normal inflation, these tires in a size 380/90R46 exhibited a durability survivability of at least 1000 hours which is approximately 2½ times the prior art tire which had the ply endings at a relatively low and closer spaced condition of about 40% Y or less. This remarkable increase in tire 10 durability under very severe testing was made possible by employing only four carcass ply layers. To achieve higher strengths it has been known to add as many as six ply layers in an agricultural tire to achieve more weight capacity, however, the addition of more plies having more weight carrying capacity incurs substantially more cost and adds more weight to the finished tire. The present invention achieves this remarkable weight carrying capacity improvement without the addition of more than four ply layers.

The advantage of the present invention is believed to be derived from the second set of plies 23C, 23D having a pair of low ply endings $T_2$, $T_2'$, but being adjacent the bead cores 21 and 22 that absorb much of the forces of the weight and torque of the tire under load so that the high ply endings which normally would initiate any separation under such extreme loads only are exposed to far less of the stress leading to less probability of a turnup separation from occurring. Accordingly while all four plies are carrying the load between the bead cores 21, 22 the radially inner plies 23C and 23D and their low turnups are securely anchoring the carcass 20 and reducing the stress on the high turnup ends of plies 23A and 23B.

While the present invention is shown with four plies it is understood that a construction with three or more plies is possible wherein at least one set of two plies is of equal width, but staggered in either a low or preferably a high ply turnup ending.

The tire as shown employed a novel method of manufacture wherein the cut width $W_B$ of the belt plies 25A through 25D was the same. Each of the carcass plies 23A and 23B of the high turnup pair of plies had the same cut ply width $W_H$. The cut ply width $W_L$ of each of the carcass plies 23C and 23D of the low turnup second pair of plies was the same. It is understood however that the belt plies 25A-25D could have been made using the two or more distinct cut widths and if such a technique was employed the tire could have the same left side and right side appearance and offset edges. Similarly the first pair of carcass plies 23A, 23B could be of different cut widths as could the second pair of carcass plies and as such the tire would have the appearance of the turnup ends as shown in FIG. 2, but identical on the left and right hand side with the tire having one of the illustrated left or right side constructions shown on both sides. Additionally while the tire 10 as shown was made with a high aspect ratio of greater than 85% preferably 90% or greater, the use of such a high and low turnup using two pairs of plies as disclosed could be beneficially applied to tires having an aspect ratio of 70% or greater.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of applicants' general inventive concept.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A high aspect ratio agricultural pneumatic tire comprising:
   a tread including a circumferential inner tread and a plurality of lugs each projecting radially outward from the inner tread;

a belt reinforcing structure including four or more belt layers reinforced by synthetic cords; and a carcass having a pair of bead portions each having a core and a bead filler above each bead core, two pair of first and second carcass plies, each ply being reinforced by synthetic cords oriented radially and wrapped from the inside of each bead core around to an axially outer turnup end, the first pair of plies being radially inward and adjacent the second pair of plies between the bead cores and having the turnup ends wrapped about the bead cores and the turnup end of the second pair of plies, and wherein the turnup end of the first pair of plies extends outwardly and radially along said bead filler to a terminal end $T_1$, $T_1'$ and said turnup ends of said second pair of plies extends to turnup ends $T_2$, $T_2'$ wherein $T_1$, $T_1'$ are located between 60% and 80% of a location Y defined as the radial location of maximum section width (SW) of the tire and the second pair of plies have the terminal ends $T_2$, $T_2'$ extend above the bead cores to a location 30% to 50% of Y.

2. The tire of claim 1 wherein the aspect ratio is greater than 85%.

3. The tire of claim 1 wherein the aspect ratio is greater than 90%.

4. The tire of claim 1 wherein the ply cords are nylon.

5. The tire of claim 1 wherein the belt cords are aromatic polyamide.

6. The tire of claim 1 wherein the terminal ends $T_1$ and $T_2$ extend radially further than the ends $T_1'$ and $T_2'$ respectively to form staggered ends $T_1 > T_1'$ by a distance $S_1$ and $T_2 > T_2'$ by a distance $S_2$ or one or both bead portions.

7. The tire of claim 6 wherein the terminal end of the first pair of carcass plies closer to the bead core $T_1$ or $T_1'$ is spaced radially outward of terminal end of the second pair of the ply end furthest from the bead core $T_2$ or $T_2'$ by an amount $S_3$ at least two times greater than the distance $S_1$ or $S_2$.

8. The tire of claim 7 wherein the distance $S_3$ approximately equals the sum of $S_1 + S_2$.

9. The tire of claim 1 wherein the belt reinforcing structure has four belt layers, a radially inner first layer, an intermediate second and an intermediate third layer and a radially outer fourth layer; each layer having width $W_1$ respectively; the adjacent layers being shifted axially B from the equatorial plane to staggered lateral ends $E_1$, $E_1'$, $E_2$, $E_2'$, $E_3$, $E_3'$ and $E_4$, $E_4'$.

10. The tire of claim 9 wherein the ends of two belt layers are substantially equal and extend axially outward of a line L perpendicular to the carcass plies and passing through a lateral tread edge on one side of the tire and are axially inward of L on the opposite side of the tire $E_1$, $E_2$, $E_3$ and $E_4$ of the respective first, second, third and fourth belt layers are each spaced a distance of about X relative to the line L, $E_1$ and $E_3$ being axially outward of L by an amount X and $E_2$ and $E_4$ being axially inward by an amount X on one side of said tire, and $E_1'$ and $E_3'$ being axially inward of L by an amount X of the tire and $E_2'$ and $E_4'$ being axially outward of L by an amount X on the opposite side of said tire.

* * * * *